No. 803,457. PATENTED OCT. 31, 1905.
H. M. WOOD.
SAW JOINTING AND SHARPENING CLAMP.
APPLICATION FILED MAR. 26, 1903.
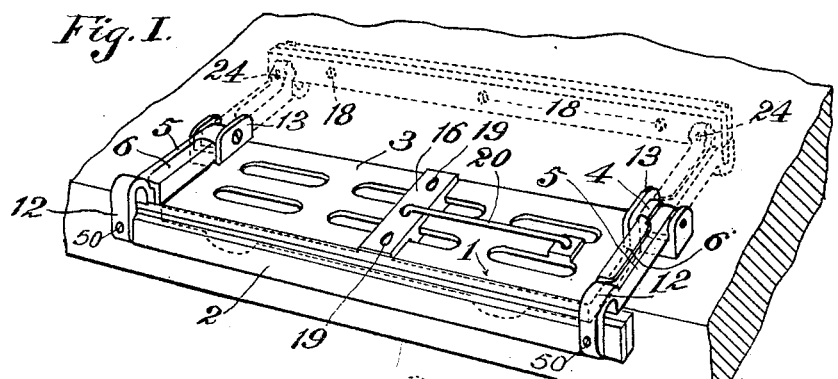
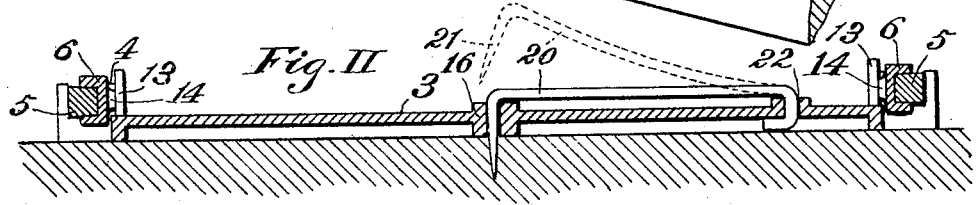
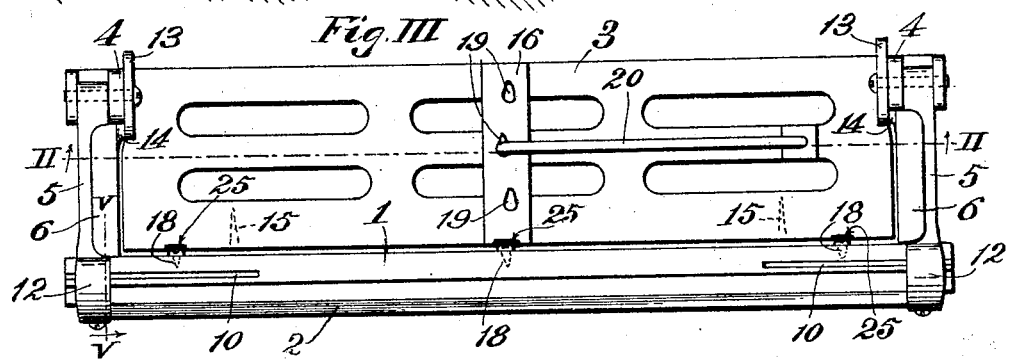
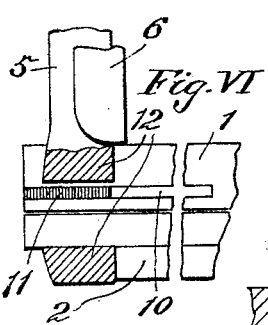 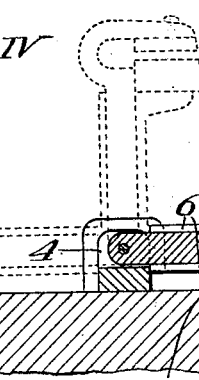 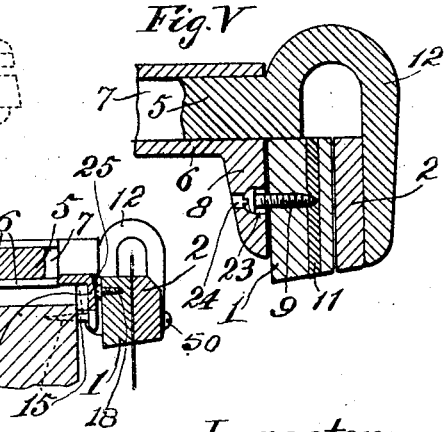
Witnesses:
C. C. Holly
G. T. Hackley
Inventor:
Harvey M. Wood
by Townsend Bros.
his attys.

UNITED STATES PATENT OFFICE.

HARVEY M. WOOD, OF DENVER, COLORADO.

SAW JOINTING AND SHARPENING CLAMP.

No. 803,457.            Specification of Letters Patent.            Patented Oct. 31, 1905.

Application filed March 26, 1903. Serial No. 149,698.

*To all whom it may concern:*

Be it known that I, HARVEY M. WOOD, a citizen of the United States, residing at Denver, in the county of Arapahoe and State of Colorado, have invented a new and useful Saw Jointing and Sharpening Clamp, of which the following is a specification.

An object of this invention is to produce a saw-clamp which is superior in its convenience in application for use, its ease and positiveness of operation, and its compactness for storage and transportation.

Further objects are to secure simplicity and cheapness of construction, deadening of the sound of filing, securing a firm resilient holding of the saw, ready adjustment of width of space between the jaws, automatic action for clamping the saw, and a yielding tension to admit and firmly clamp saws of different thicknesses without change of adjustment.

Another object is to provide means whereby the device may be quickly attached to the bench or other support and squeezed tightly against the edge thereof and whereby the device may be as readily unfastened and removed.

The accompanying drawings illustrate the invention.

Figure I is a perspective view of the invention applied on a suitable support, such as a carpenter's bench. Solid lines show the clamp in the position in which it is adjusted for clamping the saw for sharpening the same. The jaws are shown in dotted lines in position for clamping the saw for jointing the same— that is, for filing the ends of the teeth to bring them in a straight line. Fig. II is a longitudinal section on line II II of Fig. III. The clamp is shown mounted on a support, which is also shown in section. Fig. III is a plan of the saw-clamp. Fig. IV is a transverse sectional elevation of the clamp mounted on a support, portions being broken away for clearness of illustration. The clamp is shown in solid lines clamping a saw in position for sharpening. One position in dotted lines shows the saw-clamp holding the saw in position for jointing, and the other position shows the clamp open to receive the saw. Fig. V is a section on line V V of Fig. III. Fig. VI is a detail view of one end of the jaws, the supporting-arm being shown partly in section.

The clamps comprise two pairs of jaw-carrying members, one pair movably mounted on the other, and a base to which one pair of jaw-carrying members is pivoted, said base being constructed to project into the path of the other pair of jaw-carrying members to cause a relative change of position between the pairs of jaw-carrying members on movement of the pivoted pair of jaw-carrying members on its pivots.

More specifically, the clamp comprises two movable jaws 1 and 2, the jaw 1 being movable toward and from the jaw 2.

3 designates a base or plate which is provided at opposite corners with lugs 4.

The outer jaw 2 is carried by a pair of jaw-carrying members preferably constructed as arms 5, which are pivoted to the respective lugs 4. The jaw 2 may be readily fastened to the arms 5 by screws 50, as shown.

The inner jaw 1 consists of a bar which is attached at each end to a pair of jaw-carrying members, preferably consisting of slidable members, (shown as arms 6,) each member being provided with a channel 7. The channels 7 receive the arms 5, each arm 6 being slidable over an arm 5. Each arm 6 is provided with a toe 8, and the jaw 1 is held loosely on the toe 8 by means of screws 9.

The jaw 1 is provided at each end with slots 10, which extend parallel to its gripping-face a considerable distance from each end and render the end portions of the jaw resilient, so that they adapt themselves readily to the saw-blade and grip it more evenly. Within each slot 10 is a resilient pad 11, made of rubber or some other suitable material. The width of each pad is equal to the width of an arm 6. Said pad 11 acts as a reinforcement or guard to prevent the inner portion of the slotted end of the jaw from being broken when clamped tightly against the saw-blade or other article placed between the jaws. The outer end of each arm 5 terminates in a hook or finger 12, the arches of which are at some distance above the upper edges of the jaws 1 and 2 to leave sufficient room so that the cutting edge of the saw may extend the desired distance above the upper edges of the jaws 1 and 2.

It will be seen that the jaw-arm 5, arches 12, and jaw 2 comprise a jaw-carrying frame, having the outer jaw fixed with relation thereto and upon which is mounted the slidable member 6, secured to the inner jaw 1. These parts all swing together, and the slidable member 6 is connected with arm 5, thereby forming a two-membered arm, and operatively engages the lugs 4. Said lugs 4 are constructed to project into the path of the slidable pair of jaw-carrying members 6 to cause a relative change of position between the pairs of jaw-carrying members at a movement of the pivoted pair of jaw-carrying members on its pivots.

Each lug 4 is provided with a shield or flange 13 and each slidable arm 6 is provided at its inner end with a small laterally-extending boss 14, which bears against its contiguous flange 13 and sweeps around the flange when the arms 5 are turned on their pivots. The end of each arm 6 bears upon the face of its lug 4, and the contour of each lug 4 is cam-shaped—that is, the corners of each lug are rounded, and the distance from the top of the lug to the pivot is less than the distance from either side of the lug to the pivot, and the bearing-faces of the lugs are so proportioned that when the arms 5 are horizontal the arms 6 are forced out by the bearing-faces of the lugs 4, and the jaw 1 is thereby tightly squeezed against the jaw 2. When the arms 5 are vertical, or approximately so, the flattened tops of the lugs 4 allow the slidable arms 6 to drop somewhat, and the jaw 1 thus recedes from the jaw 2, so that a space is left between the two jaws, which allows for the ready insertion of the saw.

The plate 3 at its forward edge is provided with a downwardly-directed flange 17, and extending inwardly underneath the horizontal portion of the base-plate from the flange are spurs 15.

16 is a projection which is integral with the plate 3 and extends above and below the plate 3. The projection 16 is provided in this embodiment with three perforations 19, the rear portion of each perforation being contracted.

20 is a staple provided with a spur 21, which is attached to the plate 3, as at 22, preferably by running the end of the staple through a hole in the plate 3 and bending back the end, as shown. The spur 21 is adapted to be driven through either of the perforations 19 into the bench or other support to hold the device in place.

In fastening the device to the bench or other support the plate 3 is rested flat upon the bench, and the flange 17 may be driven up close to the edge of the bench by a hammer or mallet, which sinks the spurs 15 into the edge of the bench. The spur 21 of the staple 20 is then placed in a perforation 19 and the staple is driven down, sinking the spur 21 into the bench. In driving the staple the spur 21 is started with its point in the rear contracted end of the perforation 19, so that as the staple is driven the tapering spur will bear against the contracted portion of the perforation, and as the staple is driven home the spur will shift the plate 3 toward the rear of the bench, drawing the flange 17 closer to the front edge of the bench and sinking the spurs 15 more securely into the bench. With the device in position on the bench to insert the saw between the jaws 1 and 2 the latter must be swung into a position over the top of plate 3, so that the arms 5 and 6 will stand more or less vertically, which will allow the inner jaw to drop. The saw may then be inserted between the jaws with its cutting edge projecting the desired distance through the jaws. The jaws may be pressed firmly by the fingers in order to hold the saw from slipping from position while the jaws are again swung into position. As the arms 5 and 6 are swung away from the vertical in either direction, as they are movable through a semicircle, and approach the horizontal position, the arms 6 are slid outward on the arms 5 by reason of their inner ends bearing against the cam-faces of the lugs 4, and the jaw 1 is thus pushed toward the jaw 2, and the saw is tightly clamped between the jaws and ready for sharpening, setting, or jointing. If it is desired to joint or set the saw, the jaws carrying the saw may be placed in the horizontal position, (shown in dotted lines, Figs. I and IV,) while if it is desired to file and sharpen the teeth of the saw the position of the jaws and saw may be that shown in full lines, Figs. I, III, and IV.

It will be observed that the radii of the corner-curves of the lugs 4 are less than the radius from the pivot to either vertical face of the lug. Thus the greatest amount of pressure is obtained between the jaws when the arms 6 stand at an inclination of about forty-five degrees, with the corners of the lugs bearing against the ends of the arms 6. Therefore when the arms have been brought to horizontal position the arms 6 will retract slightly, owing to the resiliency of the jaw 1. Thus when the arms are in either horizontal position they are yieldingly locked in that position, as in order to throw the arms 5 and 6 up the arms 5 will be pushed out by the corners of the lugs 4. The spring of the jaw 1 is sufficient to prevent this movement from taking place accidentally. When the device is in actual use, the normal stresses upon the arms are such as tend to throw them down instead of up. The rubber pads 11 serve to take up any inequality that may exist in the length of the arms 5, as the latter may vary somewhat, as cast, and the drilling of the holes for the pivots of the arms may be a trifle inaccurate.

The toes 8 are recessed, as at 23, and the heads of screws 9 lie in the recesses. The toes 8 are also provided with perforations 24, leading to recesses 23, which allow a screw-driver to be inserted to turn the screws 9.

It will be seen that when the screws 9 are retracted in the jaw 1 the latter will be the more tightly forced against the jaw 2 when the parts are in clamping position and vice versa. The heads of the screws 9 project a sufficient distance into the recess 23 to prevent the jaw 1 from falling out, the jaw 2 standing so close.

As the jaw 1 is loosely held it can swing to accommodate itself to exactly fit flat against the saw. The heads of screws 9 form rounded abutments which rock easily in the recess 23 as the jaw 1 positions itself. The self-adjustment of jaw 1 is a desirable feature, as saws are usually made with blades of tapering thickness, the back of the saw usually being much thinner than the cutting edge, and the amount of taper varies with different saws, and the jaw 1 always lies flat and tight against the saw-blade when clamped. For relatively thick saws the screws 9 may be sunk deeper into the jaw 1, allowing the latter to recede from jaw 2, while for thin saws the screws may be retracted to advance the jaw 1 toward jaw 2.

The plate 3 is provided with cuts 25, the bottom of the cuts being inclined so that the screws 18, which project from the rear of the jaw or clamp 1, may ride through the cuts, and the inclined bottom gradually forces out the jaw 1 by bearing against the screws 18. The screws 18 are adjustable in or out as well as the screws 9, so that when they engage with the inclined portions 25 of the depending flange 17, as shown in Fig. IV, the jaw 1 will be automatically adjusted or varied in its vertical plane relatively to the other jaw, which will cause it to clamp the saw-blade firmly and uniformly at all points irrespective of the thickness of the blade.

What I claim, and desire to secure by Letters Patent of the United States, is—

1. In a saw-clamp, a pair of jaws, means for holding one jaw, comprising a pair of pivoted arms, means for holding the other jaw comprising a pair of arms slidably mounted on the pivoted arms, one pair of arms having recesses, abutments carried by one jaw and engaging in said recesses, and means for moving the jaws toward one another on the pivotal movement of said arms.

2. In a saw-clamp, a pair of jaws, a pair of pivoted arms carrying one jaw, a pair of arms slidably mounted on the pivoted arms and carrying the other jaw, said slidable arms having toes provided with recesses, abutments with rounded ends adjustably attached to said latter jaw, the rounded ends of the abutments engaging in the recesses, and means for moving the jaws toward one another on the pivotal movement of said arms.

3. A plate, a pair of arms pivoted to said plate, a pair of arms slidably mounted on the first-named arms, an outer jaw carried by said pivoted arms, an inner jaw carried by the slidable arms, said plate being provided with cuts having inclined bottoms and screws in the inner jaw, the heads of which are adapted to enter said cuts and lie against the inclined bottom.

4. A plate, a pair of arms pivoted thereto at a distance apart, a jaw carried by the pivoted arms, a pair of arms slidably mounted on the pivoted arms, a jaw carried by the slidable arms, an adjustable abutment carried by one of said jaws adapted to rest against said plate when said jaws are in a substantially vertical position and means for causing approach of the jaws as they are turning to a vertical position.

5. In a clamp, two pairs of jaw-carrying members, one pair movably mounted on the other, and a base to which one pair of jaw-carrying members is pivoted, said base having a cam portion, projecting into the path of the other pair of jaw-carrying members to cause a relative change of position between the pairs of jaw-carrying members on movement of the pivoted pair of jaw-carrying members on its pivots.

6. In a clamp, a base, a jaw-carrying frame pivoted to said base, said frame provided with an outer jaw mounted in fixed relation thereto, an inner jaw carried by said frame and mounted on a jaw-carrying member slidable on said frame, said base having a cam portion projecting into the path of said jaw-carrying member to cause one jaw to move toward the other on movement of said frame on its pivots.

7. In a clamp, a base, arms pivoted to said base, a jaw carried by said arms, slides on said arms, a jaw carried by said slides, and a cam projection on said base extending into the path of the slides to move the same radially along the arms on movement of said arms on their pivots.

8. In a clamp, a base, arms pivoted to the base and each terminating in an arched finger, a jaw carried by said fingers and leaving a vacant space between the jaw and the inner face of the arch, slides on said arms, a jaw carried by said slides and movable toward and from the other jaw, and a cam projection on said base extending into the path of the slides to move the same along the arms on movement of the arms on their pivots.

9. In a clamp, a base, arms pivoted thereto, a jaw carried by said arms, slides on said arms, a jaw carried by said slides, said slides provided with laterally-extending bosses at their inner ends, and cam-shaped lugs on said base engaging said bosses to move the slides along the arms at a movement of said arms on their pivots.

10. In a clamp, a base consisting of a plate having lugs projecting from one face thereof, arms pivoted to the lugs, a jaw carried by said arms, slides on said arms, a jaw carried by said slides, said lugs having cam-faces, arranged for engagment with the slides to move the same along the arms as the arms approach the base and shaped to allow the slides to approach the base as the arms approach a vertical drawn from the face of the base.

11. In a saw-clamp, a support, a base having a hole, a pivoted pointed member fastened to said base and adapted to project through the hole into the support, said base being provided with a flange having inwardly-projecting points adapted to be driven into the support.

12. In a clamp, a base consisting of a substantially horizontal plate having a hole therethrough and a downwardly-extending flange at one edge thereof, said flange provided with a spur extending underneath the horizontal portion of the plate, a fastener pivoted to the base and provided with a point adapted to pass downwardly through the aforementioned hole in the base, a jaw-carrying frame mounted on said base, and jaws carried by said frame.

13. In a clamp, a pair of jaws, means for holding the jaws, the ends of one of said jaws being slotted parallel to its gripping-face, and elastic material in the slots and a thin portion of the jaw intervening between the elastic material and the gripping-face of the jaw.

14. In a saw-clamp, a base, two arms pivoted thereto at a distance apart, a clamping-jaw secured to the free end of each arm, a jaw opposite said first-named jaw and having arms movable on said first-named arms, one of said jaws being loosely mounted, means engaging with said members and forcing said jaws into closer proximity as the arm is swung on its pivot and means intermediate of said arms, engaging with the loosely-mounted jaw and automatically adjusting it relatively to the other jaw.

15. In a saw-clamp, a base, a pair of arms pivotally secured thereto at a distance apart, each arm comprising two members, a clamping-jaw secured to the free end of the corresponding members of said arms, said jaws being opposite each other and relatively adjustable and one of them loosely mounted, means arranged to engage with said members and force said jaws into closer proximity as the arms are swung on their pivots and means arranged to engage with the loosely-mounted jaw intermediate the arms and automatically adjust it relatively to the other jaw upon movement of the clamp into operative position.

16. In a saw-clamp, a base, a pair of arms pivotally secured thereto at a distance apart, each arm comprising two members, the free ends of the members of each arm having opposing portions, one beyond the other, two clamping-jaws respectively secured to the corresponding portions of said members, one of said jaws being rigidly secured to its member, a screw in each end of the other jaw for holding it in position and regulating its distance from the rigid jaw, and means engaging with said members and forcing said jaws into closer proximity as the arms are swung on their pivots.

17. In a saw-clamp, a base, two arms pivoted thereto and having hooks at their free ends, a jaw carried by said hooks, members slidable on said arms and having recessed toes at their free ends, a jaw carried by said toes and provided with screws whose heads fit loosely in the recesses of the toes, and means for moving the last-named jaw toward the first-named jaw.

18. In a saw-clamp, a base, one edge of which is provided with inclined surfaces, a pair of arms pivotally secured to said base, at a distance apart, members slidable on said arms, a jaw secured to the free ends of said arms, a jaw secured loosely upon said members, screws upon said loose jaw in position to engage with said inclined surfaces on the base and cams engaging with said members for forcing said jaws into closer proximity as the arms are moving upon their pivots.

19. In a saw-clamp, a base, a pair of arms pivotally secured thereto at a distance apart, so as to be movable through a semicircle, each arm comprising two members, a clamping-jaw secured to the free ends of the corresponding members of said arms, said jaws being opposite each other and relatively adjustable, and means engaging with said members and forcing said jaws into closer proximity by reason of the movement of said arms on their pivots as they reach the limit of their movement in either direction.

20. In a saw-clamp, a base, a pair of arms pivotally secured thereto at a distance apart so as to be movable through a semicircle, each arm comprising two members, a clamping-jaw secured to the free ends of the corresponding members of said arms, said jaws being opposite each other and relatively adjustable, and a cam on the base at each pivot and engaging with one of said members and moving it longitudinally upon the other member as the arms are swung upon their pivots and causing one of said jaws to approach the other as said arms reach the limit of their pivotal movement in either direction.

21. In a saw-clamp, a base provided with double cam projections at a distance apart, arms pivoted to the respective projections, the pivots being nearer the tops than the sides of the cams, a clamping-jaw carried by said arms, members slidable on said arms, and a jaw carried by said members, arranged opposite the first-named jaw, said members engaging with the cams to force the jaws thereon toward the first-named jaw on movement of the arms to a horizontal position.

22. In a saw-clamp, a base provided with a flange along one edge and double cam projections at each end at the other edge, an arm pivotally secured to each projection, the free ends of which arms extend beyond the flanged edge, members sliding longitudinally upon the arms, said arms being provided with hooks, the points of which project below the base when the arm is at the limit of its pivotal movement in one direction and the tops of the hooks are adapted to be supported substantially on a line with the base when the arm is at the limit of its movement in the opposite direction, each of said members being in engagement at its inner end with its respective cam and having a toe at its outer end, and jaws secured to the hooks of said arms and the toes of said members, respectively.

5. In testimony whereof I have signed my name to this specification, in the presence of two subscribing witnesses, at Los Angeles, in the county of Los Angeles and State of California, this 21st day of March, 1903.

HARVEY M. WOOD.

Witnesses:
 GEORGE T. HACKLEY,
 JULIA TOWNSEND.